United States Patent [19]
Moran

[11] Patent Number: 5,487,604
[45] Date of Patent: Jan. 30, 1996

[54] MULCH RECEIVING BIN AND METHOD OF USING SAME

[76] Inventor: Ronald S. Moran, 21 Porter Street, Ryde, NSW 2112, Australia

[21] Appl. No.: 232,201

[22] PCT Filed: Oct. 30, 1992

[86] PCT No.: PCT/AU92/00591
    § 371 Date: Apr. 29, 1994
    § 102(e) Date: Apr. 29, 1994

[87] PCT Pub. No.: WO93/09044
    PCT Pub. Date: May 13, 1993

[30] Foreign Application Priority Data

Oct. 31, 1991 [AU] Australia .................. PK 9254

[51] Int. Cl.$^6$ ........................ B01F 9/06
[52] U.S. Cl. .............. 366/225; 366/230; 220/4.24; 220/693
[58] Field of Search .................. 366/14, 15, 53, 366/54, 56, 62, 63, 130, 219, 220, 225, 230, 231, 235; 220/4.21, 4.24, 293, 692, 693; 206/515

[56] References Cited

U.S. PATENT DOCUMENTS

| | | | |
|---|---|---|---|
| 209,322 | 10/1878 | Benedict | 366/220 |
| 227,239 | 5/1880 | Frentress | 366/220 |
| 1,721,796 | 7/1929 | Taylor | 366/220 X |
| 2,652,983 | 9/1953 | Hall | 366/220 X |
| 2,832,496 | 4/1958 | Williams | 220/4.21 |
| 3,139,708 | 7/1964 | Oetiker | 366/220 X |
| 3,433,385 | 3/1969 | Metivier | 220/293 |
| 4,372,686 | 2/1983 | Herfeld | 366/220 |
| 4,756,623 | 7/1988 | Bishop | 366/57 |

FOREIGN PATENT DOCUMENTS

| 995346 | 11/1951 | France | 220/4.24 |
|---|---|---|---|

Primary Examiner—David Scherbel
Assistant Examiner—Charles E. Cooley
Attorney, Agent, or Firm—Bernard L. Kleinke; Jerry R. Potts; Peter P. Scott

[57] ABSTRACT

A rotatable mulch bin is formed from two similar drum members (1) and (2), typically plastics moldings which are joined together by bolts through interconnecting flanges (4). One, but preferably both ends of the bin are provided with lids (7) and (9) for adding or removing material. The rotatable bin is mounted on a stand (12) by way of a pivot tube or rod extending diametrically through the bin on axis (13), acting as a clump breaker for material within the bin when the bin is rotated. The two drum members (1) and (2) are designed to nest within one another when dissembled giving a compact configuration for transportation or storage.

20 Claims, 4 Drawing Sheets

MULCH RECEIVING BIN AND METHOD OF USING SAME

TECHNICAL FIELD

This invention relates to a rotatable mulch bin and has been devised particularly though not solely for the mulching of organic garden waste such as lawn clippings.

BACKGROUND ART

In the past many different forms of mulch or compost bin have been provided for the mulching of garden waste such as lawn clippings, leaves, small twigs etc, many of which are stationary bins designed to stand on a ground surface. In many methods of mulch making it is desirable to turn over the material within the bin at frequent intervals, and this process is difficult with a stationary bin requiring the manual use of a fork or similar implement. This problem has been overcome in the past by providing rotatable mulch bins which rotate about an axis extending through the mid-point of the drum and at right angles to the axis of the drum itself, so that the drum may be rotated or tumbled about the axis which is typically supported on a support stand.

Rotatable mulch bins of this type have the disadvantage that they are bulky in design, taking up considerable space for storage after manufacture and particularly for transport from the place of manufacture to the point of sale. For example the number of mulch bins which can be packed into a shipping container is extremely limited due to the bulky nature of the bin.

It is a further disadvantage of rotatable mulch bins of this type, that some material placed in the bins tends to clump together even when the bin is rotated causing delays in the break down period of the grass clippings into mulch.

DISCLOSURE OF INVENTION

The present invention therefore provides a rotatable mulch bin formed from two similar drum members each having an open end provided with a joining flange and an opposite closed end, at least one said drum member having an openable closure member in its closed end, the two drum members being interconnected in use at their joining flanges so that their opposite ends are at opposed ends of the bin; and members defining a pivot axis extending diametrically through the interconnected joining flanges, said members being supported on a support stand so that the bin can be rotated about the pivot axis in use.

Preferably the two drum members are substantially identical, each having an openable closure member in its closed end.

Preferably the closure member comprises a lid secured to the bin member by a bayonnet or screw fitting.

Preferably the two drum members are designed to nest inside each other when not interconnected at their joining flanges.

Preferably the two drum members are molded from plastic material, each drum member being produced from the same mold.

Preferably the members defining the pivot axis include a tube or rod extending diametrically across the bin.

Preferably the joining flanges incorporate aligned semi-cylindrical recesses at the location of the tube, forming bearing shells for the rotation of the bin upon the tube or rod.

Preferably the tube or rod comprises a metal tube supported at each end by expandable anchor bolts engaged with the support stand and extending into the ends of the metal tube.

BRIEF DESCRIPTION OF DRAWINGS

Notwithstanding any other forms that may fall within its scope, one preferred form of the invention will now be described by way of example only with reference to the accompanying drawings in which.

MODES FOR CARRYING OUT THE INVENTION

Figure 1:
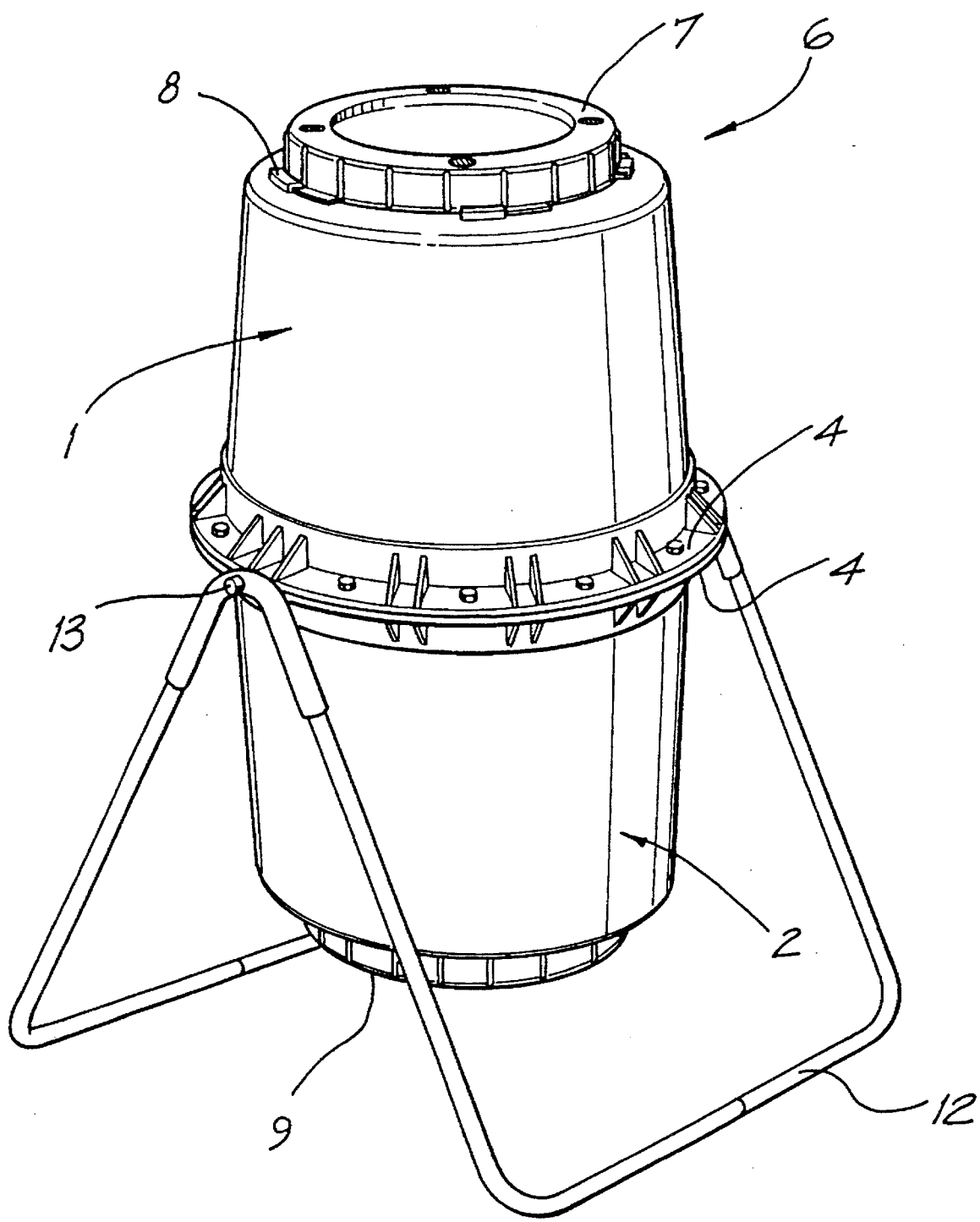
FIG. 1 is a perspective view of a rotatable mulch bin according to the invention.
Figure 2:
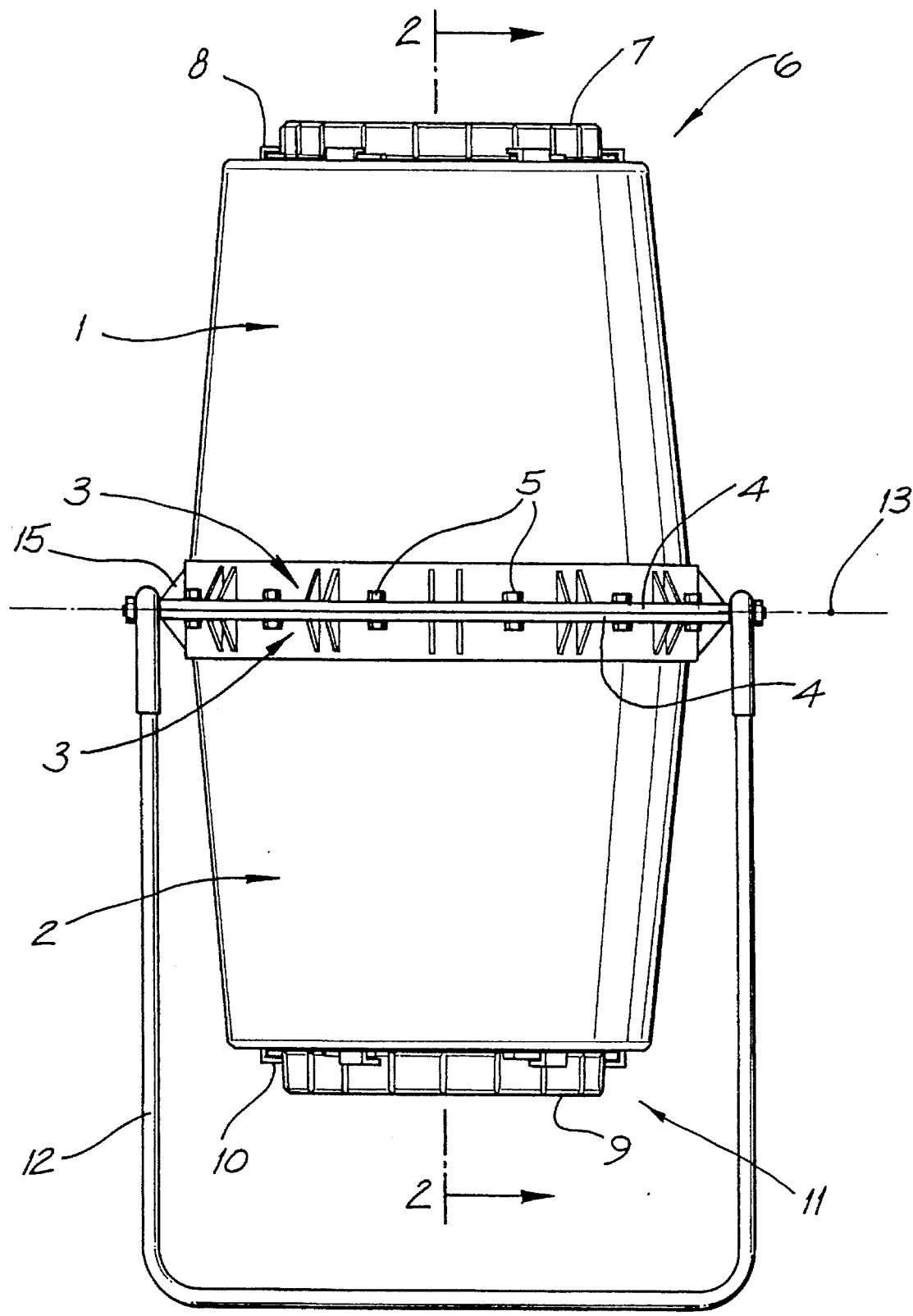
FIG. 2 is a front elevation of a rotatable mulch bin according to the invention.

In the preferred form of the invention a rotatable mulch bin is formed from two similar drum members 1 and 2 each preferably molded from a suitable plastic material. Each drum member has an open end 3 provided with a joining flange 4 which typically extends radially outwardly from the open end of the drum and is provided with a series of bolt holes so that the two drum members can be bolted together with their open ends aligned by way of nut and bolt assemblies 5.

At least one drum member has its opposite end 6 closeable by a closure member 7. The closure member typically comprises a round lid detachably secured to the bin member by a bayonnet fitting 8 or alternatively by a screw fitting (not shown).

In the preferred form of the invention the other drum member 2 is identical to the drum member 1 and is also provided with a lid 9 secured by a bayonnet fitting 10. It will be appreciated however that it is only essential to provide the bin with one opening lid and the second bin member 2 may optionally have a closed opposite end 11.

The mulch bin is supported from a support stand 12 (which is typically fabricated from metal tube) by members defining a pivot axis 13. Although the members defining the pivot axis may simply comprise bolts passing from the stand 12 into the bin in the location of the flanges 4, in the preferred form of the invention the members defining the pivot axis include a tube or rod and preferably a tube 14 extending diametrically across the bin to the outer edges of the joining flanges 4 as can be clearly seen in FIG. 3. The joining flanges are molded to incorporate aligned semi-cylindrical recesses in the location of the tube, forming bearing shells for the rotation of the bin upon the tube 14.

Figure 3:
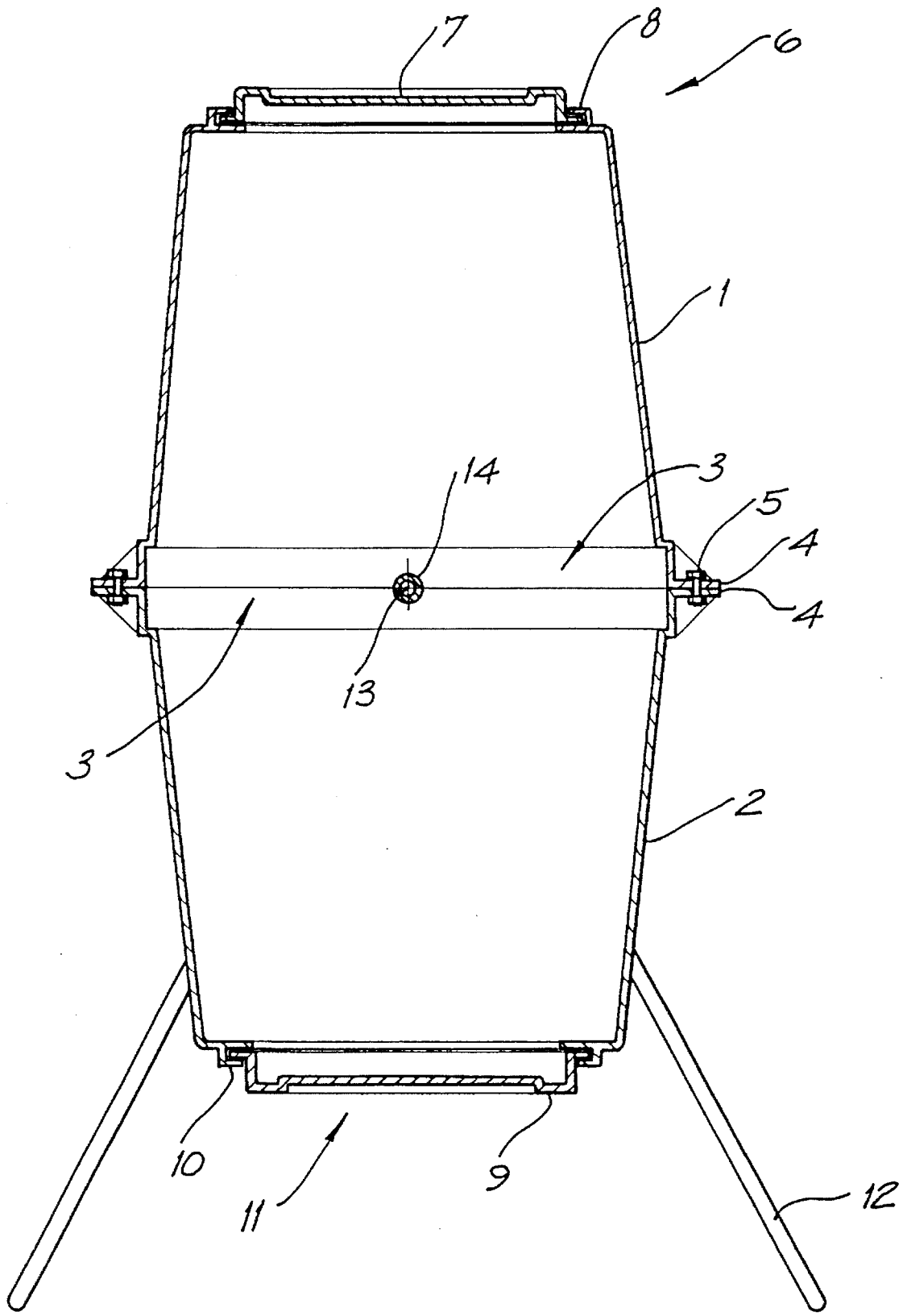
FIG. 3 is a side cross-sectional elevation of the mulch bin shown in FIG. 1.
Figure 4:
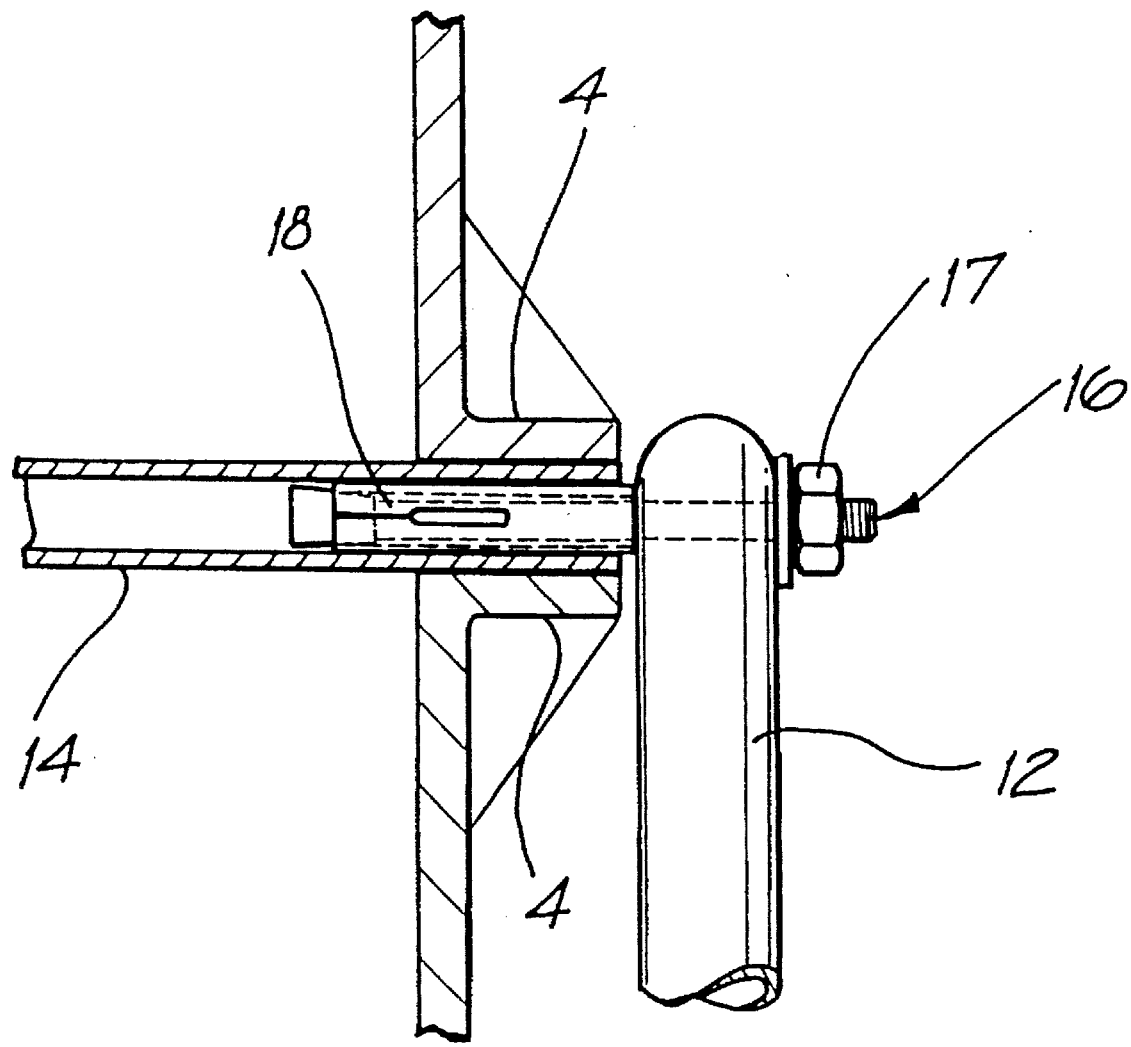
FIG. 4 is a scrap view to an enlarged scale showing a vertical section through one end of the pivot tube on which the bin rotates.

As can be seen in FIG. 3, the flange 4 is provided both in the vicinity of the semi-cylindrical recesses and also generally around the flange with reinforcing triangular fillets 15.

The metal tube 14 is supported by expandable anchor bolts 16 passing through the support stand 12 on either side of the bin and into the ends of the tube 14. Once so assembled, the bolt heads 17 may be tightened causing the anchor member 18 to expand within the tube 14 and firmly secure the tube in place on the stand 12 in a simple yet effective manner. Once the two drum members 1 and 2 are assembled on the tube 14, the entire bin so formed can then be rotated about the horizontal axis defined by the tube 14.

In use a rotatable mulch bin according to the invention has a number of important advantages over rotatable mulch bins hitherto known. Firstly because the bin is provided with lids 7 and 9 at either end, the bin is much easier to empty than conventional rotatable mulch bins as both lids can be removed at the same time for ease of clearing the bin.

Because the bin is provided with a tube or rod 14 extending diametrically through the center of the bin, the tube acts as a "breaker bar" for clumps of grass clippings contained within the bin which fall from one end of the bin to the other when the bin is rotated. This is a considerable advantage over earlier rotatable mulch bins in which grass clippings clump together and therefore take a long time to break down into mulch.

The rotatable mulch bin according to the invention is also considerably less expensive to manufacture and transport to the point of sale than previously known bins. Because the bin is formed from two drum members, the size of the die required for injection molding is approximately one half that required to mold a bin in one piece. This results in considerable savings in die cost and tool handling. Furthermore, once the drum members have been molded, they can be nested one inside the other for storage and transport to the point of sale. In this way it is possible to pack many times the number of rotatable mulch bins according to the invention into a shipping container than has been hitherto possible using conventional one piece molded bins.

I claim:

1. A rotatable mulch bin, comprising:
   a pair of drum members, each drum member having an open end provided with a joining flange and an opposite closed end;
   at least one of said pair of drum members having an openable closure member disposed at said opposite closed end;
   said pair of drum members being interconnected together at the joining flanges so that the opposite ends are disposed spaced apart from one another for helping to define a garden waste receiving bin;
   members including a breaker bar and defining a pivot axis extending diametrically through the interconnected joining flanges for breaking up clumps of garden waste;
   bearing means disposed on said drum members for supporting rotatably said bar to help facilitate the substantially free rotation of the bin about said pivot axis; and
   a support stand for supporting from below said bar, said bar being supported so that said bin is rotatable about said pivot axis to cause the garden waste to fall under the force of gravity against the breaker bar to facilitate mulching the waste.

2. A rotatable mulch bin as claimed in claim 1, wherein said pair of drum members are substantially identical, both drum members having an openable closure member on a respective closed end.

3. A rotatable mulch bin as claimed in claim 2, wherein each openable closure member includes a lid secured to the respective drum member, and bayonnet means for securing said lid to an individual one of the drum members.

4. A rotatable mulch bin as claimed in claim 1, wherein said pair of drum members are molded from plastic material, each drum member being produced from the same mold.

5. A rotatable mulch bin as claimed in claim 1 wherein said pair of drum members are designed to nest inside each other when not interconnected at their joining flanges.

6. A rotatable mulch bin as claimed in claim 1, wherein said pair of drum members are composed of a plastic material.

7. A rotatable mulch bin as claimed in claim 1, wherein said bar extends to the outer edges of the joining flanges, said flanges each incorporating a semi-cylindrical bar receiving recess to form said bearing means for the rotation of the bin upon the bar.

8. A rotatable mulch bin as claimed in claim 7, wherein said breaker bar is a metal tube and wherein said tube is supported at each end by expandable anchor bolt means for engaging the support stand and for extending into the respective ends of the metal tube.

9. A rotatable mulch bin according to claim 1, wherein said pair of drum members are substantially similar.

10. A rotatable mulch bin according to claim 1, wherein said bearing means is defined by a pair of recesses.

11. A rotatable mulch bin according to claim 10, wherein said pair of recesses are disposed on said flanges, each flange having an individual recess disposed thereon.

12. A rotatable mulch bin according to claim 11, wherein each recess has a semi-cylindrical configuration.

13. A rotatable mulch bin according to claim 1, further comprising anchor bolt means for securing said breaker bar to said support stand.

14. A rotatable mulch bin according to claim 13, wherein said anchor bolt means includes a pair of anchor bolts.

15. A rotatable mulch bin according to claim 14, wherein each anchor bolt is an expandable anchor bolt and is adapted to be received within an open terminal end of said breaker bar.

16. A rotatable mulch bin according to claim 1, wherein said flanges are each reinforced with triangular fillets.

17. A rotatable mulch bin according to claim 1, wherein said breaker bar is a rod.

18. A rotatable mulch bin according to claim 1, wherein the mulch bin may be disassembled for shipping purposes.

19. A method of using a mulch bin according to claim 1, comprising:
   placing a quantity of garden waste material into one of the drum members; and
   rotating said bin about its pivot axis periodically to cause the garden waste material within the bin to fall under the force of gravity against the bar to break apart clumps of garden waste to help facilitate the formation of mulch.

20. A rotatable mulch bin, comprising:
   a plurality of drum means, each drum means having an opening terminating in flange means for enabling at least two individual ones of said plurality of drum means to be joined together for defining a garden waste receiving bin;
   elongated breaker bar means partially disposed within the center of said bin for helping to separate clumps of garden waste within said bin as the bin is rotated about a pivot axis defined by said bar means;
   said elongated bar means having a pair of opposite ends and including an elongated member being sufficient in length to extend across substantially the entire transverse dimension of said bin;
   means defining a bearing shell disposed at said flange means for receiving therein a portion of said elongated member to help facilitate the substantially free rotation of the bin about said pivot axis;
   support means for resting on a stationary surface and for supporting said bin at a sufficient distance above the surface to permit the bin to be freely rotated about the transverse axis of said bar means; and
   securing means at said opposite ends of said bar means for retaining said bar means rotatably on said support means.

* * * * *